Patented Apr. 18, 1950

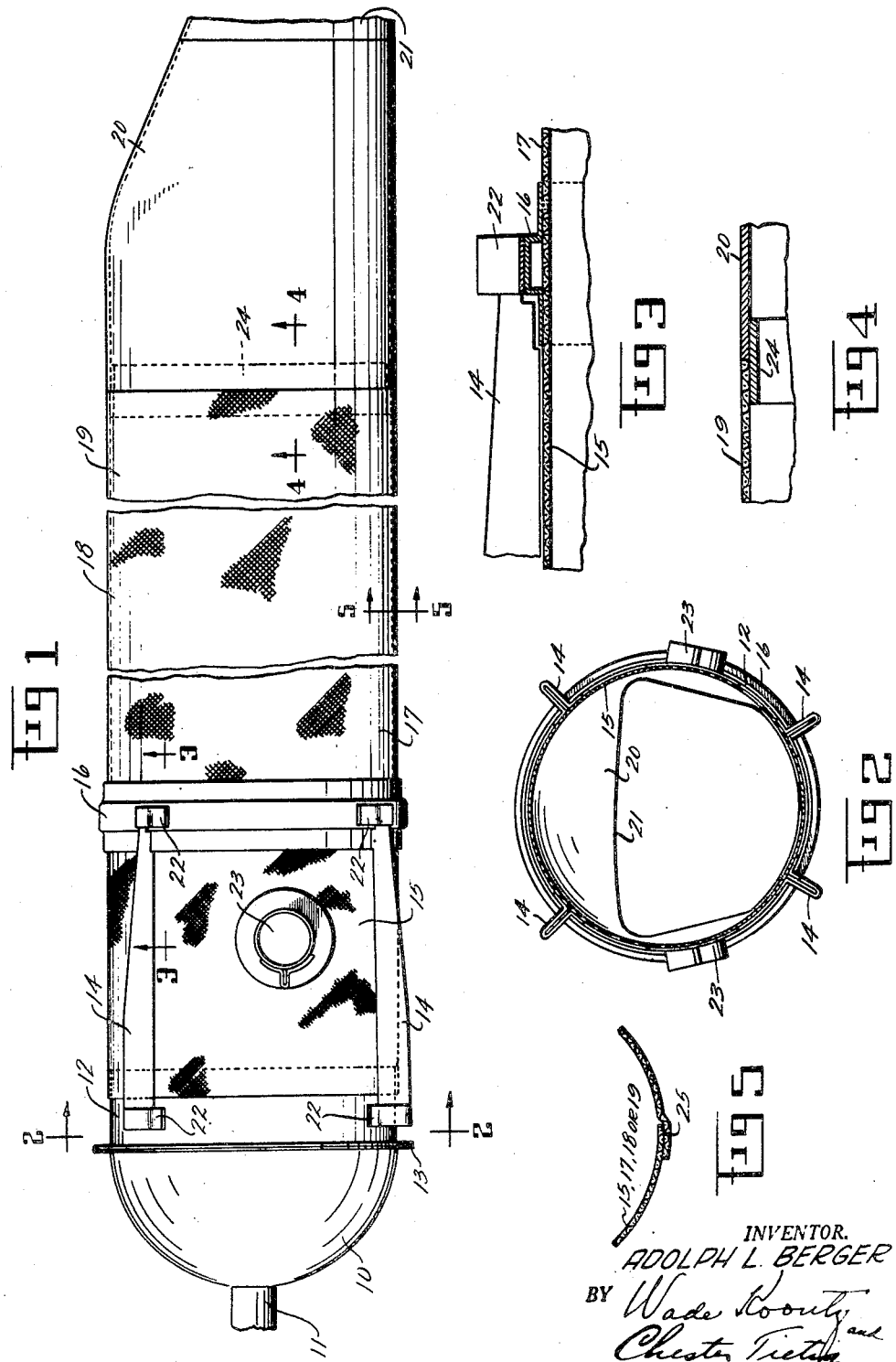

2,504,106

UNITED STATES PATENT OFFICE 2,504,106

COMBUSTION CHAMBER FOR GAS TURBINE ENGINES

Adolph Louis Berger, Dayton, Ohio

Application June 17, 1947, Serial No. 755,107

2 Claims. (Cl. 60—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel combustion chamber for gas turbine engines of the kind used in aircraft for jet propulsion. It also relates to a novel method of feeding air for combustion in such chambers.

It is extremely desirable to make the combustion which actuates a gas turbine as uniform as possible. This is especially true in military pursuit aircraft engines. The conventional combustion chambers are substantially cylinders of sheet metal which are perforated in longitudinal rows and there are about six rows per cylinder. The purpose of the perforations is to allow air to feed through the chamber to mix with the fuel spray injected by a nozzle at the head of the cylinder. Since the perforations are comparatively large, based on a comparison with those of the present invention, the air stream is not broken up as fine as it should be and the degree of mixing leaves considerable to be desired. The air is not taken in over more than a small fraction of 360°.

One object of the present invention is to provide a combustion chamber for turbines, which chamber is made of wire screen and consequently will allow the admission of air through 360° of circumference.

Another object is to provide a combustion chamber in which the screen openings are graduated in size from small to large along the path of the injected fuel.

Another object is to provide a method of feeding air by selecting the size of mesh in the new combustion chamber in four graduated sizes which bear a definite relation to the air need of the fuel jet during combustion. In other words, the method comprises in apportioning air in a definite linear relation to the fuel along the combustion chamber by regulating the size of the screen mesh accordingly. By the use of this method, combustion proceeds more smoothly and completely and flame is prevented from entering the air passage between the housing and the combustion chamber.

Referring to the accompanying drawing:

Fig. 1 is a side elevation of my combustion chamber.

Fig. 2 is a cross section taken on the line 2—2 of Fig. 1.

Fig. 3 is a fragmentary section taken on the line 3—3 of Fig. 1.

Fig. 4 is a fragmentary section taken on the line 4—4 of Fig. 1.

Fig. 5 is a fragmentary section taken on the line 5—5 of Fig. 1.

In Fig. 1, 10 is a conventional head or dome in which there is a fuel nozzle 11, 12 is an imperforate short cylindrical section which is attached to the dome 10 by a flange 13. The function of the section 12 is to furnish a base for the attachment of brackets 14 which are spaced equidistantly around the circumference of the chamber. The brackets 14 are attached by means of welded clips 22, some of which are on section 12 and some on a reinforcing ring 16. The brackets 14 serve to hold the dome 10 and section 12 demountably onto the rest of the structure.

The brackets 14 extend over a cylindrical section 15 of fine screen, preferably 50 mesh, 29 gauge or thereabout. A second section 17 is provided with somewhat coarser screen, say 40 mesh. A third and fourth section 18 and 19 respectively provided they are similar in construction to section 17 and it is within the purview of the invention to use as many sections as desired. However, the third section 18, is made of screen of 30 mesh and the fourth section 19 of 20 or 10 mesh. It is to be understood that the mesh sizes herein specified may be varied to suit different engine sizes and conditions, so long as ratios of air intake are kept within limits to be here specified for the different sections.

The range of proportions of air to be taken in at the different sections are as follows:

| Section | Proportion of Total Air by Volume |
|---|---|
| | Per Cent |
| 1 | 5-15 |
| 2 | 15-25 |
| 3 | 25-60 |
| 4 | Remainder. |

At the end of the assembly of section 19, there is an imperforate tail pipe 20, which is shaped to fit the engine housing (not shown). The tail pipe 20 is preferably attached to said housing at the end 21. The pressure of brackets 14 and of the flange 13 against the housing provide a means of minimizing vibration of the combustion chamber against the engine housing but do not anchor it longitudinally, so that it may expand lengthwise.

The combustion chamber dome 10 may be provided with a spark plug (not shown) which forms no part of the present invention. If flame transfer ports 23 are provided, together with pipes (not shown) for transferring the flame from one combustion chamber to the other, then only one combustion chamber dome per engine need be provided with a spark plug.

Junction between sections 19 and 20 may be made by the provision of a strip 24 within the chamber, to which the ends of sections 19 and 20 are welded. Such construction is shown in Fig. 4.

A longitudinal junction of the screen sections 16, 17, 18 and 19 may be made by a lap weld 25 as shown in Fig. 5.

I claim as my invention:

1. A combustion chamber for a gas turbine engine, said chamber comprising a dome, fuel injection means therein, four cylindrical sections made of wire screen, means for attaching said sections to said dome and to each other to form a substantially cylindrical chamber, the section closest to said dome being formed of about 50 mesh per square inch screen, the next section of about 40 mesh per square inch screen, the next section of about 30 mesh per square inch screen and the section closest to the exhaust end of said chamber being formed of screen between about 20 mesh to 10 mesh per square inch.

2. A combustion chamber for gas turbine power plants of the type adapted to receive compressed air and to deliver heated gases for the turbine comprising a cylindrical casing having an open end for the discharge of heated products of combustion and its other end closed by an imperforate end forming a metal dome, fuel injection means secured to said dome for injection of fuel into said casing, said cylindrical casing being formed of at least four connected longitudinally-extending sections between said dome and the discharge end of said casing, said sections each being constructed of heat-resistant metal wire screen with the section adjacent said dome being the sole means for admitting air for mixing with fuel injected within the said dome and having a mesh size adapted to restrict the air flow therethrough sufficiently to insure primary combustion, the succeeding sections toward the discharge ends of said cylindrical casing being of progressively larger mesh size to permit increased quantities of air flow to enter radially through the sections of the combustion chamber.

ADOLPH LOUIS BERGER.

REFERENCES CITED

The following references are of record in the file of this patent:

UNITED STATES PATENTS

| Number | Name | Date |
|---|---|---|
| 2,268,464 | Seippel | Dec. 30, 1941 |
| 2,422,213 | Smith | June 17, 1947 |
| 2,432,359 | Streid | Dec. 9, 1947 |
| 2,447,482 | Arnold | Aug. 24, 1948 |

FOREIGN PATENTS

| Number | Country | Date |
|---|---|---|
| 315,252 | Great Britain | July 10, 1929 |